United States Patent

Dybdal

[19]

[11] Patent Number: 6,055,431
[45] Date of Patent: Apr. 25, 2000

[54] ADAPTIVE CONTROL OF MULTIPLE BEAM COMMUNICATION TRANSPONDERS

[75] Inventor: Robert B. Dybdal, Palos Verdes Estates, Calif.

[73] Assignee: The Aerospace Corporation, El Segundo, Calif.

[21] Appl. No.: 08/993,923

[22] Filed: Dec. 19, 1997

[51] Int. Cl.[7] .................................................. H04Q 7/20
[52] U.S. Cl. .......................... 455/450; 455/13.4; 455/62; 455/509
[58] Field of Search .................................. 455/12.1, 13.1, 455/13.4, 427, 446, 62, 453, 509, 450; 370/318, 319

[56] References Cited

U.S. PATENT DOCUMENTS

| | | | |
|---|---|---|---|
| 4,858,225 | 8/1989 | DeSantis | 370/323 |
| 5,448,621 | 9/1995 | Knudsen | 455/12.1 |
| 5,657,323 | 8/1997 | Jan et al. | 370/252 |
| 5,790,534 | 8/1998 | Kokko et al. | 370/335 |
| 5,886,988 | 3/1999 | Yun et al. | 370/329 |
| 5,924,015 | 7/1999 | Garrison et al. | 455/13.4 |
| 5,960,354 | 9/1999 | Einola | 455/454 |
| 5,963,865 | 10/1999 | Desgagne et al. | 455/450 |

FOREIGN PATENT DOCUMENTS

97/45982   12/1997   WIPO ............................ H04L 12/28

OTHER PUBLICATIONS

Katzela et al. Channel Assignemnt Schemes for Cellular Mobile Telecommunicaiton Systems: A Comprehensive Study, IEEE Personal Communications, Jun. 1996.

*Primary Examiner*—Reinhard J. Eisenzopf
*Assistant Examiner*—Charles N. Appiah
*Attorney, Agent, or Firm*—Derrick Michael Reid

[57] ABSTRACT

An adaptive method controls the operation of multiple beam antenna systems used in communication satellite transponders. This method adaptively controls the coverage area assignments, frequency assignments, transmitted power level assignments, and component allocation assignments of these multiple beam antenna transponders in response to the existing and time varying demands for satellite resources. The method adaptively controls and manages the operation of the satellite transponders to optimize the overall capacity of the communication satellite.

2 Claims, 2 Drawing Sheets

USER FLOW DIAGRAM

ADAPTIVE TRANSPONDER DIAGRAM

USER FLOW DIAGRAM

ADAPTIVE CONTROL OF MULTIPLE BEAM COMMUNICATION TRANSPONDERS

STATEMENT OF GOVERNMENT INTEREST

The invention was made with Government support under Contract No. F04701-93-C-0094 by the Department of the Air Force. The Government has certain rights in the invention. The invention described herein may be manufactured and used by and for the government of the United States.

SPECIFICATION

1. Field of the Invention

The present invention relates to the field of communication satellites, and more specifically, to an adaptive method for controlling multiple beam antenna systems used in the payload transponder.

2. Background of the Invention

Multiple beam antennas have been widely used in communication satellite systems. Multiple beam antennas provide service to a variety of user terminals located within the field of view of the multiple beam antenna. These multiple beam antennas provide respective coverage areas and can increase the satellite capacity by reusing the same frequency bands in different, separated coverage areas within the field of view. The ability to reuse the same bandwidth simultaneously in geographically separated coverage areas permits more information to be transferred and greatly increases the capacity of the multiple beam antenna over a single beam antenna. The individual beams of the multiple beam antenna can be combined together in a fixed arrangement to provide a plurality of irregular static coverage areas corresponding to fixed geographical boundaries, such as permanent geopolitical boundaries and different time zones. While multiple beam antennas have widely recognized benefits and have experienced considerable development and operational use, several shortcomings in the multiple beam antenna systems exist.

A service area is defined by the coverage area of respectively assigned antenna beams or group of antenna beams. Present practice is to assign to an anticipated large user coverage area either static multiple beams inherent in the antenna individually, or to combine beams to generate static footprints conforming to the user coverage area. The assigned static footprints are fixed coverage areas. Beams with adequate spatial separation achieve required spatial isolation by virtue of that spatial separation, so that the respective coverage areas can reuse the same frequency assignments, including the number of subbands, bandwidths and polarization state assignments. A disadvantage of fixed coverage area is that the communication capacity may not be effectively utilized when active users drop out or are not included in a coverage area.

The individual beams within a group of beams defining the fixed static coverage area have been adaptively nulled in the direction of interference to reduce interference received from undesired signals to maintain communications with desired users within the fixed coverage area. This adaptive operation of the multiple beam antennas is widely known; however, while effective in reducing interference power and thereby improving communications capacity to users, the limitations of fixed coverage areas and frequency assignments remain, and are limited by the transponder design.

When the same frequency band is used to provide independent service to geographically separated coverage areas, sufficient spatial isolation between these coverage areas must exist so that information communicated from one area does not interfere with information communicated from another area. The required isolation between separated coverage areas has been achieved by both fixed spatial coverage area separation and fixed assignments of different frequency subbands, bandwidths, and/or orthogonal polarization states to adjacent beam positions permitting, the beams to effectively communicate simultaneously. Fixed frequency assignments allow for signal isolation within a coverage area. Fixed frequency assignments and fixed coverage assignments provide for the necessary signal isolation between signal communications in adjacent coverage areas. The orthogonal polarization states have been either horizontal and vertical linear polarization states, or clockwise and counterclockwise circular polarization states. The static frequency assignments create isolated static beam patterns and resulting isolated static beam coverage areas. The differing frequency subbands, bandwidths and orthogonal polarization states assignments have been assigned to respective separated beams forming respective resulting coverage areas providing adequate signal isolation between the resulting coverage areas. The frequency assignments achieve the required signal isolation using separated beam patterns of the antenna with fixed frequency assignments to the individual beams of the multiple beam antenna. In this way, adjacent beams operate with adequate spatial isolation, and multiple signals within a coverage area operate at adequate signal isolation.

The problem with these fixed subband, bandwidth and polarization state assignments is that the satellite capacity is uniformly distributed over the field of view by these fixed assignments in the frequency reuse plan, but yet the demands for system capability typically vary over the field of view. Some areas have a high number of users and their demands for capacity may exceed the bandwidth assigned to the beam servicing that area. Conversely, other areas may have only a few users, and excess capacity exists in those beam areas Furthermore, these demands for capacity in specific geographical areas can be anticipated to vary during the course of the satellite's lifetime, and in many cases, during the course of a day. A disadvantage of static assignments of fixed frequency subbands, bandwidths and polarization states is the under utilization of the antenna system capacity in the face of varying demands for service.

Satellite transmitters have a maximum power output level. The goal in satellite operation is to operate the satellite transmitters at a level close to the maximum power output level to achieve maximum power efficiency and provide as much as possible received signal strength to the receiving user system. The satellite system can control the level of the transmitted power. The power output level of the transmitter is controlled by varying the input power level to the transmitter so that the output level is maintained at a level providing maximum capacity. If an inadequate input signal power level is used, the transmitted power level is reduced and the user reception is degraded by a reduced signal level. Alternatively, if an excessive power signal level is used, the transmitted signal will be distorted by intermodulation products, again degrading user reception.

Two different methods have been used to control the transmitter output levels. The first power control method is to control the transmitter operation by ground command to vary the transponder's gain level so that the desired transmitter output power is maintained. The disadvantage of this method is that the timeliness of the ground command may be inadequate in systems where the user demands rapidly vary. The second power control method is to control the transmitted power level using an automatic leveling loop to maintain the desired output level of the transmitter. This loop samples the output level and controls the gain level at the transmitter input to maintain proper operation. Such a method can be, and has been, effectively used where a given transmitter is connected to a single beam port. However, for phased array antennas used in lower altitude orbits where each array element has its own transmitting device, this method is disadvantageously impractical.

Most communication satellites are located in high geosynchronous orbits, which maintain a geographically fixed field of view containing a variety of communication users. Low earth orbit satellites likewise have a fixed field of view, but by contrast, the geography encompassed within the field of view continuously varies as the low earth orbit satellite proceeds along its orbital trajectory. Transmitted power within a coverage area is distributed among the signals to respective users. Coverage areas with a high density of users requires more power than a low user population density coverage area because a minimum signal strength and a corresponding minimum power level is required for adequate reception for each user. The more users in an area, the more signal and the more power required. Efficient utilization of power demands that the transmit power in each area be at a level proportion to the number of signals, that is, the number of users in each area. Systems with equal power distribution in respective coverage areas may disadvantageously waste power in low population density coverage areas and disadvantageously under power signal strengths in high population density coverage areas. For example, beams with power levels supporting numerous users at a given time can cover ocean areas containing a sparse number of users at a later time disadvantageously consuming power at times in the presence of little or no user activity.

The technology for the multiple beam antennas for low earth orbit satellites varies from that used with high geosynchronous orbit satellites. At the higher geosynchronous orbits, the earth subtends a relatively narrow field of view and limited scan antennas are commonly used. A typical multiple beam antenna for geosynchronous orbits consists of an offset reflector with a cluster of feeds in the focal region. Each of these feeds has an associated beam direction. By contrast, at the lower earth orbits, the field of view subtended by the earth greatly increases. A typical antenna design for the low earth orbits is an array with multiple corporate networks to generate multiple beams.

A trend exists towards more capable satellite systems results in multiple beam antennas with a larger number of narrower beams to service the available field of view. As the number of beams increases, the management of the satellite resources becomes more important. When very narrow beam widths are used, active tracking of a ground beacon and mechanically repositioning the antenna in response to attitude variations has been used. With the smaller beam widths, satellite attitude variations in orbit become more important. Present satellites have a limited ability to respond to these attitude variations in maintaining the required communication performance. Finally, present satellites have a long lifetime but an inability to replace defective components. Existing systems maintain operations in the event of component failure by disadvantageously using redundant elements. These and other disadvantages are solved or reduced using the present invention.

SUMMARY OF THE INVENTION

An object of the present invention is to increase antenna system capacity by adaptive dynamic assignments of the frequency subbands, bandwidths and polarization states in response to changing demands for service.

An object of the present invention is to adaptively control the power levels in respective coverage areas having unequal user population densities.

Another object of the present invention is to provide adaptive dynamic control of beam coverage area in response to time varying communication capacity and coverage requirements.

Another object of the present invention is to provide adaptive control of multiple beam antenna systems so that the resources can be efficiently used in orbit by dynamically responding to user capacity needs and variations with time.

Yet another object of the present invention is to control the frequency subbands, bandwidths and polarization assignments of individual beams, or groups of beams, so the overall allocated bandwidth can meet the demand for capacity in both crowded and sparsely used areas while preserving the required isolation.

Still another object of the present invention provides adaptive control of user access through varying coverage areas optimized to service both individual and communities of users.

A further object of the present invention is to adaptively control the power output level of antenna system transmitters so that the desired power output level is maintained for maximum power efficiency for delivering as much power as possible to system users, and for avoiding excessive drive levels that result in intermodulation and other distortions to transmitted signals.

Yet another object of the present invention is to adaptively turn off failed satellite component resources and turn on other functioning satellite component resources to maintain satellite performance in the presence of failed satellite component resources in orbit.

Yet another object of the present invention is to reduce the power consumption of the satellite by turning off satellite resources that are not needed in a given time period to optimize satellite performance.

The present invention provides a method for adaptively controlling and managing satellite transponders that use multiple beam antenna systems so that the satellite capacity is effectively used. This adaptive control method preferably includes allocating frequency assignments, coverage area assignments, transmit power level assignments, and component resource assignments. The adaptive control method is well suited for satellites having uplink and downlink antennas.

The method provides for adaptive dynamic control of the beam coverage areas to respond to time varying communication capacity and coverage requirements. Users are provided access to the processing system of a satellite, so that the users can specify their communication needs so that satellite will provide the necessary frequency bandwidth and coverage capabilities. A user transmits requirements to the satellite through the uplink earth coverage antenna using, for example, a protected coded message, whereupon the processing system within the satellite examines the current satellite configuration, and dynamically provides necessary alteration to the assignments to accommodate the requirements of the requesting users as well as other system users. The user may then be notified of the satellite resources available to the user through an earth coverage downlink antenna. The method accordingly provides management control of the satellite system and assigns communication resources to allocate the resources of the satellite to maximum benefit.

The method provides dynamic power level control by monitoring the signal levels and variations to establish an appropriate gain level that adaptively responds to changes in the communication traffic in the transponder. The dynamic power level control is well suited to low earth orbit, personal communication satellite systems. In cases of low user requirements, portions of the system covering areas without user can be turned off, saving valuable on orbit prime power, when the satellite passes over areas of little or no use, such as in vast tracks of ocean.

In cases of high user requirements, the satellite coverage bandwidth, and the hand over of satellites from one coverage area to another as the satellite proceeds in orbit can be adaptively controlled. Accordingly, the ability to assign communication resources on a dynamic basis will increase satellite efficiency and capacity. Satellite attitude variations would also be sensed, and the coverage areas changed by electronically changing the combinations of beams that generate the coverage area without the need to provide alternative mechanical repositioning. The method can dynamically power down component resources that are not currently being used to conserve prime power consumption. The method can also power down failed component resources and reallocate working component resources to maintain satellite operation in the presence of the failed component resources. The present invention advantageously reduces the need for redundant components resources used for maintaining satellite operation in the presence of a component failure. These and other advantages will become more apparent from the following detailed description of the preferred embodiment.

DETAILED DESCRIPTION OF THE PREFERRED EMBODIMENT

Figure 1:
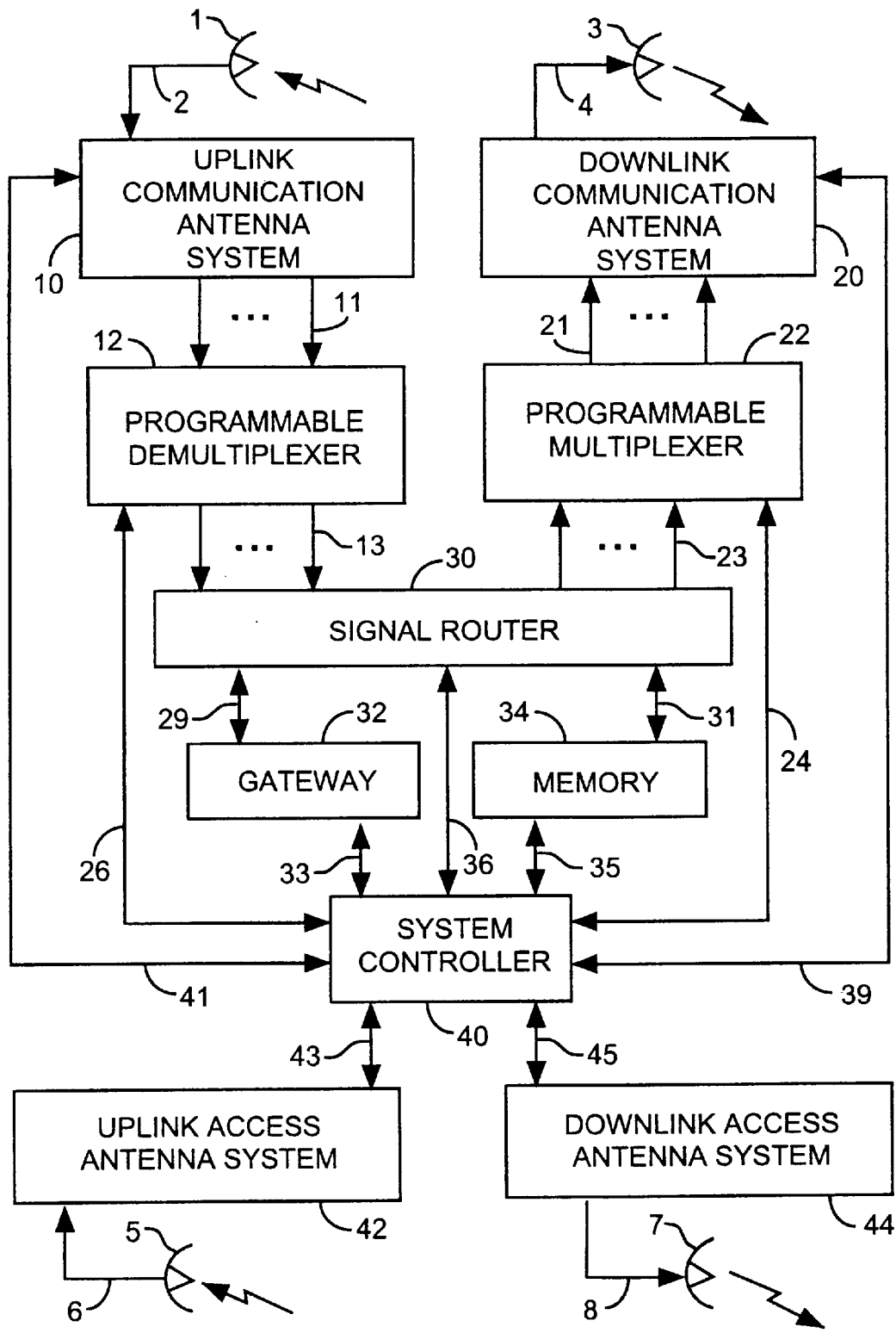
FIG. 1 is a block diagram of an adaptive control satellite system.

The invention is described with reference to the figures using reference designations. Referring to FIG. 1, a satellite communication adaptive transponder includes an uplink communication antenna 1 receiving uplink communication signals 2, a downlink communication antenna 3 transmitting downlink communication signals 4, an uplink access antenna 5 receiving uplink access information signals 6, and a downlink antenna 8 transmitting downlink access information signals 8. The adaptive transponder also includes a system controller 40 used to control and adaptively reconfigure the transponder system. The controller 40 controls the operation of an uplink communication antenna systems 10, a downlink communication system 20, a demultiplexer 12, a multiplexer 22, and a router 23. The controller 40 responds to the uplink access information 6 and generates downlink access information 8, respectively received by the uplink access antenna 5 and the downlink access antenna 7. The uplink communication antenna 1 provides the uplink communication signals 2 to the uplink communication antenna system 10 having communication receivers, not shown. The downlink communication antenna 3 provides the downlink communication signals 4 to the a downlink communication antenna system 20 having transmitters, not shown. The transponder system functions to receive the uplink communication signals 2 and relays those uplink signals as the downlink communication signals 4 during transponder relay communications between origin and destination users. The transponder is a typical component of a communication satellite having antennas 1 and 3 which have a plurality of antenna beam positions.

The uplink communication antenna system 10 has outputs 11 communicating the received communication signals 2 to the programmable demultiplexer 12 having demultiplexer outputs 13. The downlink antenna system 20 receives the downlink communication signals 4 from the programmable multiplexer 22 having multiplexer outputs 21. The multiplexer 22 receives router outputs 23 from the signal router 30 connected to a gateway 32 and memory 34 respectively through gateway lines 29 and memory lines 31. The multiplexer 22 and demultiplexer 12 provide frequency filtering, preamplification, conversion, and amplification required to receive and transmit the communication signals 2 and 4. However, unlike conventional designs, each output 11 and 21 of the programmable demultiplexer 12 and a programmable multiplexer 22 can have varying the number of subbands, varying bandwidths of the subbands, and varying selectivity characteristics selected by commands 26 from the adaptive system controller 40. The selectivity characteristics of the isolation filters are used to define the subbands. The multiplexer 22 and demultiplexer 12 can be fabricated from analog filters and switching components. Digital designs can be implemented using either general purpose or custom digital processing technology. A digital demultiplexer can be reprogrammed to reconfigure the subbands, bandwidth values, and the number of active outputs 11 and 21.

The signal router 30 is a programmable combiner serving several different functions. The demultiplexer outputs 13 are the outputs 11 of the uplink antenna system 10 and can be separated for retransmission on the same or different downlink beam positions. The demultiplexer subbands corresponding to information at the same frequency band can be combined to generate different coverage regions. For reflector antennas having a distinct beam output 11 for each beam position, the appropriate beam outputs 11 are simply added by the router 30 to reconfigure the desired coverage area. For array antennas, the routing to each array element with the appropriate amplitude and phase weighting to generate the desired coverage contour is accomplished by commands 41 to the antenna system 10. When digital demultiplexing and multiplexing is used, the necessary array excitation coefficients can be obtained by digital beam forming where complex matrix multiplication for narrow bandwidth applications. The signal router 30 may be an adaptive multiple beam antenna processor deriving the complex matrix elements coefficients to dynamically generate footprints to optimize coverage for particular user communities. The matrix elements are the weightings in amplitude and phase that provide the summation of antenna beam outputs 11 to reconfigure coverage areas. In some cases, received uplink communication signal 2 received by the uplink communication antenna system 10 may be routed by demultiplexer 12 to the on-board memory 34 for storage. The uplink communication signals 2 stored in memory 34 can then be retransmitted at a later time through the router 23, multiplexer 20, and the downlink antenna system 20 for subsequent transmission. Two reasons exist for the need to delay the transmission of uplink communication signal 2. First, the destination of the downlink signal 4 may not be within the field of view of the satellite transponder so that rebroadcast occurs at a later time when the destination terminal is visible to the downlink antenna 3. A second reason is that the capacity of the satellite may be currently committed, and the received communication signal 2 may be later broadcasted when the capacity is available. Another alternative is to use the programmable system controller 40 to interface with the gateway 32 to extend satellite coverage beyond the field of view available to the uplink communication antenna system 10 and downlink communication antenna system 20. The gateway 32 could be used to route uplink communication signals through the downlink access antenna 7 then transmitting the downlink communication signals when the destination is outside the field of view of the downlink antenna 3, and could be used to route uplink communication signals received by the uplink access antenna 5 to the downlink antenna 3, when the origin is outside of the field of view of the uplink antenna 1.

The uplink access signals 6 are received by an uplink access antenna systems 42 and the downlink access signals 8 are generated by a downlink access antenna systems 44. The access systems 42 and 44 provide access information and status to and from the transponder controller 40 and the origin and destination users. These two access antenna systems 42 and 44 provide the ability for users to request transponder capacity and receive confirmation access information for adaptive transponder control. Both of the access antennas 5 and 7 cover the entire field of view. In principle, full field of view coverage can be achieved by combining the total number of multiple beams of 10 and 20. Such antenna coverage can be easily achieved by a small earth coverage antenna system well known by those skilled in the art. User requests of the access information for satellite resources are sent through the uplink access antenna 42. Such requests would include access information on the data quantity and data rate for the uplink communication signal 2 and the destination of the downlink communication signal 4. These requests 43 are routed to the adaptive controller 40, where a determination is made of availability of the current frequency assignments, the present power assignments, antenna coverage assignments, and timing requirements. Upon completion of this processing, the access information 45 generated and status information signals 8 are broadcasted to the origin and destination terminals by the downlink antenna 7 so that the users may use the transponder system. System protection of the unauthorized access to the access systems 42 and 44 is provided by conventional signal coding techniques. Code acquisition by the user may be achieved by a downlink timing signal within the downlink access information signals 8. The access information 43 and 45 transferred through subsystems 42 and 44 have a low data rate. This access information can be spread with a wide bandwidth spread spectrum code for desired protection without interfering with the communication by the communication antenna systems 10 and 20. Alternatively, communication signals 2 and 4 can be assigned a separate frequency subband for dedicated user access.

When the adaptive system controller 40 receives user requests 43 for satellite services, the current usage and configuration of the transponder is determined by the controller 40. The user may specify an origin location or the origin location can be derived using direction finding techniques of the multiple beam antenna system 10. One method of specifying the origin location is to divide the coverage area into cells having one beam receive the highest signal level in a direction toward the origin location so that the user can specify his origin location by a cell number and the destination location of the communication signal using cell numbers within the access information. The excess capacity in existing frequency assignments can be used to determine if the origin user can be accommodated within the existing frequency, power, and antenna beam coverage assignments.

If the existing configuration cannot support the user request, available frequency assignments are determined within the frequency regime subject to isolation requirements of separated beams using the same frequency subbands. The antenna coverage to the destination is examined to determine if the coverage configuration is adequate, and if not, necessary modification of the coverage assignment and power assignment are made by sending commands 36 to a complex matrix multiplier in the router 30 for combining beam coverage areas 30. The controller 40 can send commands 36 to the router 30 to reconfigure the power transmission level for each beam position. Commands 39 and 41 will turn off transponder beams that are not used, such as when over an ocean without destinations, and can vary the power level of the beams of respective downlink communicating signals 4.

Another function of the adaptive multiple beam controller 40 is to minimize coverage to areas with known interference sources, or to areas where downlink transmission would provide interference, or to areas where perhaps the administrative problems of licensing for system use have not been solved. This can be accomplished by constraints stored in the controller 40 sending commands 24 and 36 to the router 30 and multiplexer 22. As required for a specific configuration, adaptive uplink interference cancellation commands 41 and 26 are sent to the uplink antenna system 10 and demultiplexer 12. Similarly, for interference protection, the controller 40 could use spread spectrum processing and reformatting commands 39 for downlink transmission to reduce the amount of interference power transmitted by the downlink antenna 3. Changes in multiple access formats can also be accomplished in controller 40.

The adaptive controller 40 also monitors the operation of the transponder by sensing built-in test equipment BITE, not shown. In the event of component failure, alternative operations of the transponder could be provided to the extent practical subject to the constraints imposed by failed components. The controller 40 monitors BITE and generates status information 45 and commands 24, 26, 36, 39, and 41. Status information signals 8 can be communicated to the destination using downlink access antenna 7. The controller 40 can also send commands 24, 26, 39, and 41 to turn off failed components in the even of a component failure. The failed components can then be removed off a list of available transponder resources, such as a beam transmitter of the downlink communication system 20. The controller 40 can further vary the power level of each beam of the downlink antenna system 20; for optimum power utilization.

The controller 40 is interfaced to the origin and destination users by access signals 6 and 8. During the satellite lifetime, some changes in operation can be anticipated, and the ability to upload software changes for the controller 40 can be accomplished. Similarly, a ground access capability may be desirable to override decisions and/or features incorporated by the controller 40. For example, the controller 40, through BITE sensing, may detect a failed component, but switching to a redundant unit might be desired only after a decision is made on the ground.

The adaptive control method can be implemented using technology and subsystems for adaptive control of the transponder configuration by adaptively changing frequency, coverage, and power assignments. For example, frequency assignments for multiple beam antennas usually fixed by analog filter parameters can be adaptively changed. Beam coverage areas may be changed by ground commands and the combining circuitry of the router 30. Beam position power levels can be varied by the router 30. The adaptive control method provides a flexible control system for the adaptive operation of multiple beam transponders that autonomously provides accessing for users, variation of antenna coverage, and optimization of power assignments and frequency assignments to enhance system capacity while maintaining adequate isolation between users to avoid interference.

An example illustrates the operation of the adaptive method using multiple beam antennas 1 and 3 having seven beams, a central beam surrounded by six others. Each beam has the capacity to support up to a fixed number of users, and the users are assumed to have identical needs, capabilities and data rates. The allocated bandwidth is initially divided into four identical subbands. Three of these subbands are allocated in a fixed manner to the seven beams, the central beam is assigned one subband, and the other outer beams are assigned to the other subbands. In this way, each adjacent beam operates in a different frequency subband so that the required beam isolation is achieved as an example of the fixed frequency assignments. The fourth subband of the allocated bandwidth may be adaptively used. This fourth subband is used because the seven beam antenna design has limited frequency reuse capabilities. The traffic in each beam position for both the uplink and downlink antennas 1 and 3 are monitored by the controller 40. In this way, the amount of available capacity in each beam position can be determined. The controller 40 adaptively controls the coverage area and capacity of the transponder, and several alternatives exist with this exemplar design to demonstrate those capabilities. One alternative is that the traffic is adequately served by the first three subbands. In this case, the fourth subband is not needed and all of the equipment associated with the fourth subband can be turned off, reducing prime power consumption. Another alternative arises when the downlink beam capacity in one beam position is exceeded. If some of the users can tolerate delayed transmission and if memory 34 is available, the controller 40 can store the communication information in memory 34 and transmit the communication information when downlink capacity is available at a later time. In this situation, the resources in the fourth subband are not required and turned off and prime power is preserved. If memory 34 is not available, the fourth subband can be turned on and a beam coincident with the one beam having the capacity shortfall can transmit the stored communication. In this case, the antenna 1 receives communication information on all four channels. Each subband has a plurality of communication channels. Under adaptive control some channels communicate through the subband which no longer has exceeded capacity and the remaining channels are assigned to the fourth subbands. The channels remain isolated so that interference does not occur. These alternatives illustrate the method by which extra capacity is afforded to an area with high demand while prime power consumption is minimized.

Another alternative, when the beams service sparsely used areas, will illustrate how the coverage areas can be varied. For example, when two of the outer beam areas with one area having two users and the second area has three users the capacity in these two areas may be under utilized. In this case, the controller 40 can command the transponder system to form a single coverage area from the two beams to accommodate all the users in both beam positions while turning off transmission through the third beam. The controller 40 has adapted the transponder system to the low capacity requirements of this low capacity situation and the prime power consumption of one of the beams has been saved.

Another alternative illustrates how the adaptive method can adapt to failed components. When one of the downlink communication transmitters fails, the fourth subband can be commanded to this beam position to recover the capacity lost in the failed beam position. The detection of the failed transmitter can be detected by BITE. The controller 40 can also routinely sample test points to identify changes in component performance to identify failed components. By tabulating the component changes and reporting only those changes, the amount of status information 8 transmitted is minimized. In the event of failures, more detailed status information can be requested by ground commands 6 to diagnose anomalies more fully. Failures, effects of temperature variations, and shortfalls in prime power availabilities are major concerns in transponder operation. The adaptive controller 40 together with ground commands 6 can be effective in maintaining transponder performance.

The control of downlink transmitter power level is another application of the adaptive control method. By way of example, one subband may be used for three of the outer beams of the exemplar seven beam antenna. While the necessary isolation is afforded by the outer beam separation, control of the transmitted levels is maintained. For example, when one of the outer beam positions has nine users, when a second outer beam position has eight users, and when the third beam position has only one user, all are communicating over the one subband. If the full transmit power is used in the beam position containing the single user, the single user would have additional margin. However, the additional power for the single user might result in interference to the other two outer beam positions. Thus, in this situation, the gain of the beam position would be controlled by the controller 40 so that the beam with the single user does not interfere with other beam positions. Monitoring the communication traffic levels on the beam positions and the respective power levels provide the basis to reconfigure the downlink transmitted levels so that the transmitter is used effectively and interference does not occur between different beams even during frequency reuse.

Figure 2:
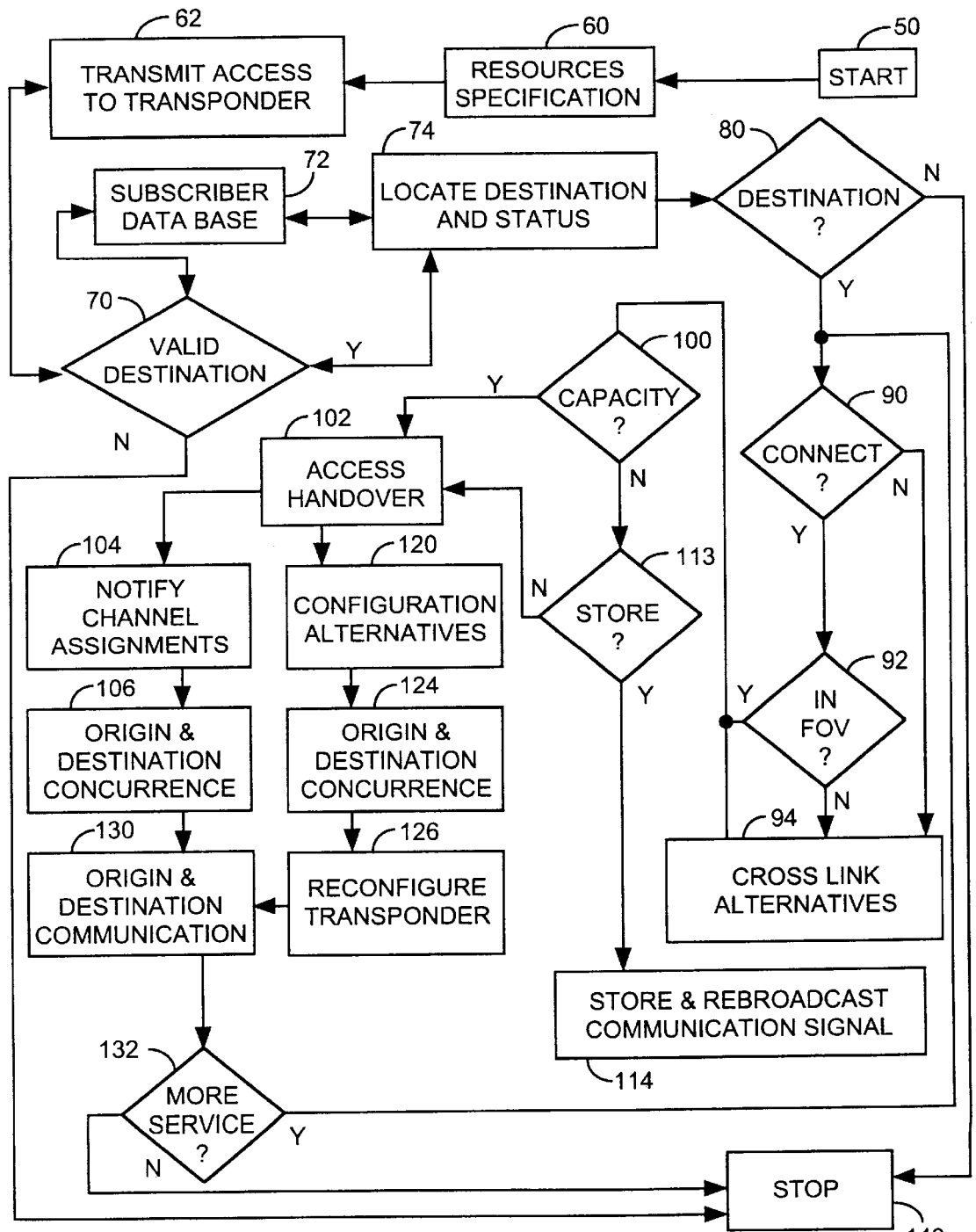
FIG. 2 is a flow diagram of an adaptive control method for allocating satellite resources.

Referring to FIGS. 1 and 2, operation of the transponder system responds to user requirements determined from access information 6. Initially 50, the user specifies the resources 60 required to satisfy present communication needs. The origin user transmits 62 access information 6. The user requirement specified by the user access information 6 contains several elements. The access information identifies the origin user and the destination user by using respective identification numbers. An origin user may be required to specify 60 the origin location and the destination location for navigation services such as the Global Positioning System. The user transmits 62 his resource specification to the satellite transponder system through the earth coverage uplink access antenna 42. The type of service needed must also be specified 60. For example, the user may specify 60 half-duplex when data is to be transferred to the destination, full-duplex for interactive communication needs, or conference services for multiple destinations. The amount of data to be transferred and the desired data rate is specified 60 in the uplink access information 6.

The controller 40 then determines 70 if the user and destination are valid system subscribers from a subscriber data base 72 and the location and status of the destination 74 is accessed. If either the user or destination are not valid system subscribers, the request is terminated 140. If both user and destination are valid subscribers, the destination location and its status must be determined 80. The destination location may be supplied by the origin user in the resource specification 60 or may be stored in the subscriber data base 72. The users may have mobility and may not be at the locations within the data base 72. The location of the destination must be verified and status must be determined 80. If the destination is busy at the time and unable to participate, the request is terminated 140. Similarly, the data rate capability of the destination must be verified. Verification and status of destination location are done via the earth coverage links 42 and 44.

After user and destination are verified and available 80, the controller 40 then determines 90 if the transponder hardware configuration can support the requested connection. The communication also depends on having available antenna coverage when the destination is in the field of view 92 so that connectivity and communication between user and destination can occur 90 and having the capacity to provide the communications for the users is determined 100. Several alternative situations exist. Alternatives arise when the on-board connectivity 90 when the transponder hardware can not support the requested communication, or when the destination is beyond the field of view 92 of the transponder system. When determined 92 that the origin and destination are in view of the same transponder at a later time period, the uplink communication could be stored and broadcasted at a later time 114 when memory 34 is available 113 and the origin user is thennotified. When the user and destination are sufficiently separated that they will never be in view of the same satellite, the communications can be routed 94 through gate way 32 and/or a ground gateway or terrestrial systems, not shown.

In low altitude satellite systems, when the destination is not within the field of view 92, one alternative is to store data into on-board memory 34 for subsequent broadcast 114 when the destination is within the field of view. When the destination is not within the FOV 92, without cross link alternatives 94, and when the transponder has capacity 100, a further alternative exists when the memory 34 is provided 113. In this case, the user transmits the communication signals 2 to the uplink antenna 1 and the communication signal data is stored 114 in memory 30 for rebroadcast at a later time. This alternative is advantageous even when the connectivity 90 is available but the capacity 100 is not. In this case, the information stored in memory 34 can be rebroadcast 114 when capacity is available 100 and the destination is within the field of view 92. For transponder systems having memory 34, alternative needs can be specified.

If the destination 80, connectivity 90, and capacity 100 are available, the controller 40 establishes the desired with the destination within the field of view 92 communication handover 102 when necessary. For low altitude satellites, the origin and destination may transverse several beam positions and may be handed over 102 to another satellite during the transmission time. Thus, part of the connectivity determination 90 and an available capacity determination 100, involves a hand over 102 for continued communication during the requested time period. The origin user and destination users are notified 104 through the downlink 8 of a channel downlink assignment within a subband. Concurrence 106 with this assignment 1 is made through the access systems 42 and 6, prior to user communication 130 of the communication signals 2 and 4. The origin user sends the request and the destination user send the concurrence to the resource assignment 106 for communications 130, or the users can terminate the communication 140. The users can request additional system time 132 for extended communications.

If the present configuration does not support the request communication 90, but the destination is in the field of view 92, then the transponder can evaluate configuration alternatives that will support the requested communication. After concurrence 124 with a proposed reconfiguration, the transponder may be reconfigured 126 to support the requested communication. When the existing system connectivity configuration 90 and capacity 100 cannot support a user request, the multiple beam antennas 1 and 3 can be reconfigured 126 to provide the necessary connectivity and capacity to serve the user request if the transponder is not fully committed. In this alternative, the existing satellite configuration and alternatives are examined 120 and the ability to change coverage is assessed 120. After users have concurred 124 in the new configuration, the excess capacity is then assigned 126 to meet the user needs. In some cases, user needs cannot be fully met, and the purpose of obtaining origin and destination concurrence through the earth uplink 6 is to notify the origin and destination of available resources for approval for the reduced service. In the event that this alternative is used, command 24, 26, 39, and 41 to reconfigure 126 the antenna systems 10 and 20 are issued 126 and the communication proceeds 130.

The adaptive method dynamically changes resource assignments to respond to changing demands for service. This is accomplished by monitoring the system capacity to determine availability for additional users or need for redistribution of on-board resources. When programmable multiplexers 22 and demultiplexers 12 are included within the transponder system, flexible control of the bandwidths in the beam positions can be achieved.

Inherent within monitoring the channel capacities is the information needed to control the power levels in the individual beams based on the number of users. The collection of communication signals 6 is amplified to produce the input to the downlink system 20. Knowledge of the number of communication signals and respective data rates establishes an input power level from the collection. In regenerative repeater transponder systems where the uplink communication signals 2 are demodulated, routed, and remodulated for downlink broadcast, a simple count of the number of signals suffices to determine the power of the signal collection that forms the input 21 to the transmitting antenna system 20. In frequency translating transponder systems, a measurement of the power level of the collection can be made. Knowledge of the input level of the collection, the gain of the downlink transmitter system 20, and the desired transmitter power level provides the information needed to adjust the input power level of the collection of communication signals 21 to produce the desired downlink power level.

The adaptive control of the coverage areas can be determined from the number of users in each beam position. When the number of users falls below a predetermined level, beams can be combined to produce a wider coverage area appropriate to the user demands in that area. Similarly, when the number of users exceeds the capacity allocated, additional subbands and bandwidths can be allocated to meet the demand. When applied to the collection of multiple beams, the transponder beams are regrouped in response to user demands is suitable coverage areas and transmission power levels.

The adaptive method also turns off portions of the transponder system when demands are minimal and to use existing capacity to compensate for failed elements. When satellite demands are low, the under capacity subbands are not used, reducing power consumption. If one of the downlink transmitters should fail, the fourth subband resources could be utilized to maintain service within the region serviced by the failed transmitter. The adaptive method reassigns frequency assignments including the number of subbands in use, the respective bandwidth and polarization states, reassign beam assignments for adaptive coverage areas, and reassign power assignments to reassign beam power levels and to turn off unneeded or failed components. The adaptive method may be further modified to include other adaptive features, which may fall within the spirit and scope of the following claims.

What is claimed is:

1. An adaptive communication method for reconfiguring a transponder comprising an uplink antenna and a downlink antenna communicating over frequency subbands communicating communication signals through frequency assignments within the frequency subbands, the method comprising the steps of, assigning the frequency subbands as assigned subbands and dedicated subbands, the assigned subbands and dedicated subbands are isolated from each other, the monitoring current communication signals on the assigned subbands, receiving requests for the communication of additional communications signals, determining when the sum of the additional communication signals and the current communication signals would exceed the capacity of any one of the assigned frequency subbands, and reconfiguring the transponder to add the dedicated frequency subbands to increase the capacity over the assigned frequency subbands to respectively communicate both the additional and current communication signals.

2. The adaptive communication method of claim 1, wherein the assigned subbands have a power assignment for communicating the current communication signals using a respective assigned transmitter, the method further comprising the steps of, configuring the transponder to assign the assigned subbands to the respective operational transmitter for communicating the current communication signals, and reconfiguring the power assignment to add an additional dedicated transmitter for respectively communicating the additional communication signals.

* * * * *